US006943510B2

(12) United States Patent
Gorti

(10) Patent No.: US 6,943,510 B2
(45) Date of Patent: Sep. 13, 2005

(54) EXCITATION CIRCUIT AND CONTROL METHOD FOR FLUX SWITCHING MOTOR

(75) Inventor: Bhanu Gorti, Abingdon, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 10/360,968

(22) Filed: Feb. 7, 2003

(65) Prior Publication Data

US 2003/0117095 A1 Jun. 26, 2003

Related U.S. Application Data

(63) Continuation-in-part of application No. 10/213,777, filed on Aug. 6, 2002, now abandoned.
(60) Provisional application No. 60/370,352, filed on Aug. 6, 2001.

(51) Int. Cl.[7] .............................. H02P 1/00; H02P 1/22
(52) U.S. Cl. ...................... 318/275; 318/268; 318/445; 318/432; 318/434; 318/798
(58) Field of Search ................................ 318/268, 275, 318/800, 801, 430–434, 445, 798

(56) References Cited

U.S. PATENT DOCUMENTS

| | | | | |
|---|---|---|---|---|
| 2,629,849 | A | * | 2/1953 | Barnes ........................ 318/246 |
| 3,881,081 | A | | 4/1975 | Schilling et al. |
| 4,006,334 | A | | 2/1977 | Robotham et al. |
| 4,258,368 | A | | 3/1981 | Arnold et al. |
| 4,280,026 | A | | 7/1981 | Alessio |
| 4,444,091 | A | | 4/1984 | Jorgensen, Jr. |
| 4,451,865 | A | | 5/1984 | Warner et al. |
| 4,466,040 | A | | 8/1984 | Barthel et al. |
| 4,628,233 | A | | 12/1986 | Bradus |
| 4,853,821 | A | | 8/1989 | Lewis |
| 4,970,355 | A | | 11/1990 | Haeusslein et al. |
| 5,654,595 | A | | 8/1997 | Ferguson |
| 5,723,914 | A | | 3/1998 | Nakayama et al. |
| 6,118,239 | A | * | 9/2000 | Kadah ........................ 318/268 |
| 6,153,838 | A | | 11/2000 | Wadge |
| 6,208,042 | B1 | | 3/2001 | Solis |
| 6,285,096 | B1 | | 9/2001 | Muller et al. |
| 6,392,373 | B1 | * | 5/2002 | Glasgow et al. ............ 318/430 |
| 6,445,879 | B1 | * | 9/2002 | Youn et al. ................. 388/811 |
| 6,462,506 | B2 | * | 10/2002 | Cochoy et al. ............. 318/801 |

FOREIGN PATENT DOCUMENTS

| | | |
|---|---|---|
| DE | 3146495 A1 | 7/1983 |
| DE | 3316671 A1 | 11/1983 |
| DE | 4107431 C2 | 10/1992 |
| DE | 4304690 C1 | 8/1994 |
| DE | 196 16 851 A1 | 10/1996 |
| EP | 0 141 166 | 9/1984 |
| EP | 0 048 793 | 9/1985 |
| WO | WO2004/073140 * | 8/2004 |

* cited by examiner

Primary Examiner—Marlon T. Fletcher
Assistant Examiner—Tyrone Smith
(74) Attorney, Agent, or Firm—Harness, Dickey & Pierce, P.L.C.

(57) ABSTRACT

An excitation circuit for a flux switching motor. The circuit includes a low-value film capacitor across the DC side of a bridge rectifier. A plurality of electronic switches are arranged in an H-bridge configuration for switching current flow through an armature winding of the motor in accordance with a PWM control scheme and single-pulse control scheme controlled by a microcontroller. A start-up diode is placed across the field winding of the motor and is electronically switched out of the circuit after a startup phase of the motor has completed. The circuit implements armature energy recirculation through the field winding during startup to promote more uniform and quicker startup of the motor. The use of a film capacitor improves the power factor of the circuit, helps to eliminate the introduction of harmonics into the AC voltage source, and helps in mitigating EMI. Reverse commutation is used to bring the motor to a quick stop when it is powered off.

44 Claims, 7 Drawing Sheets

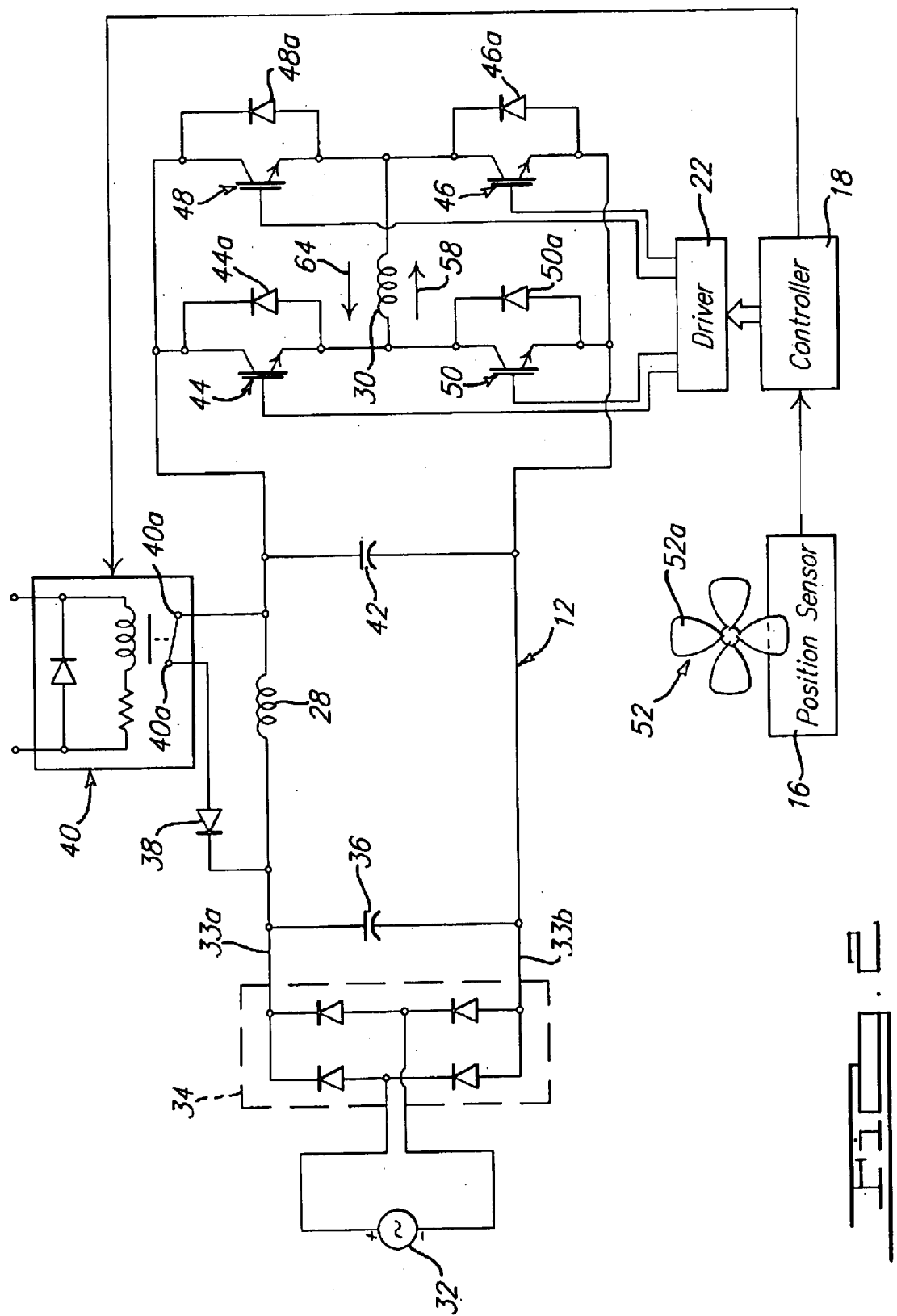

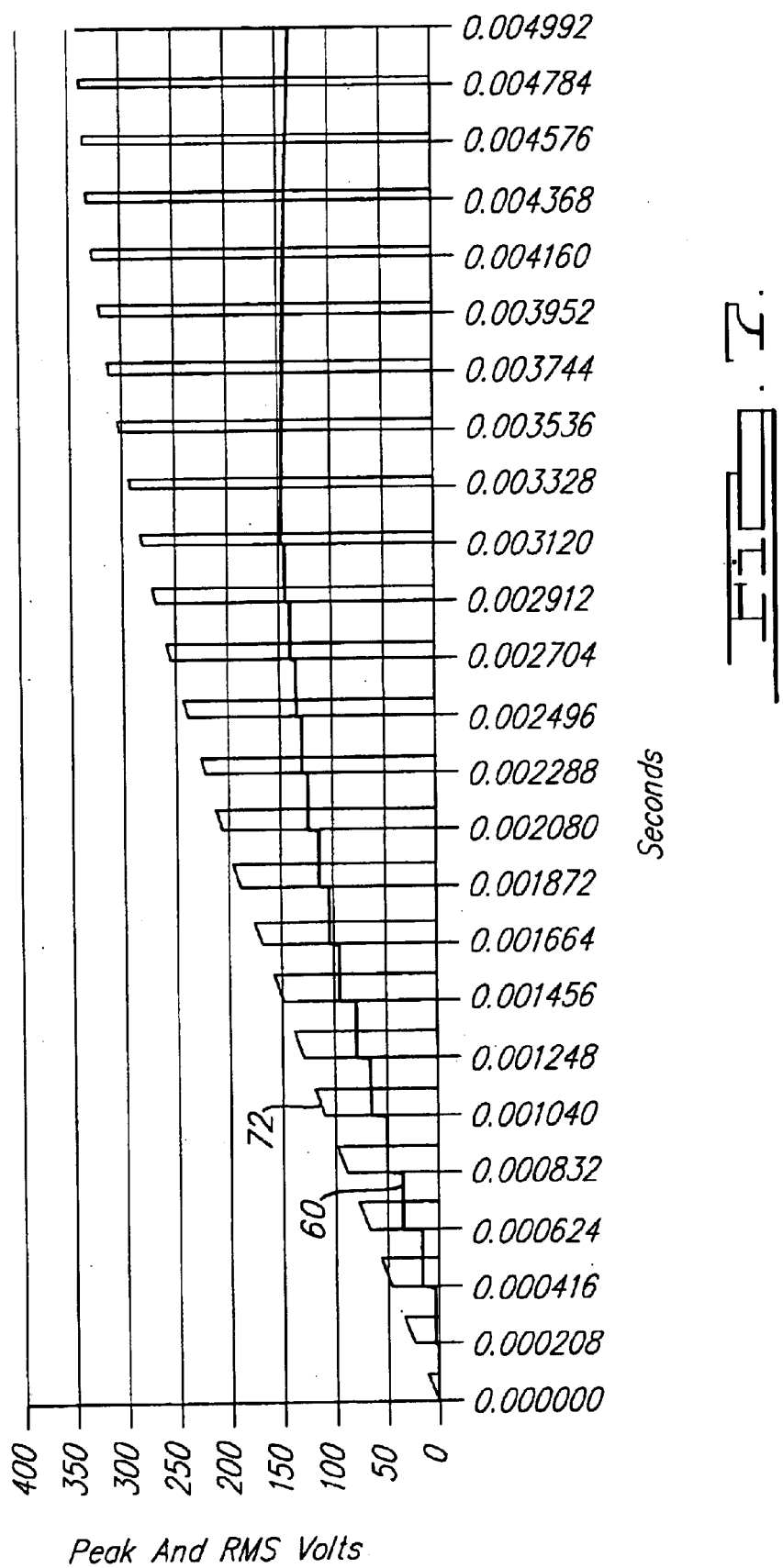

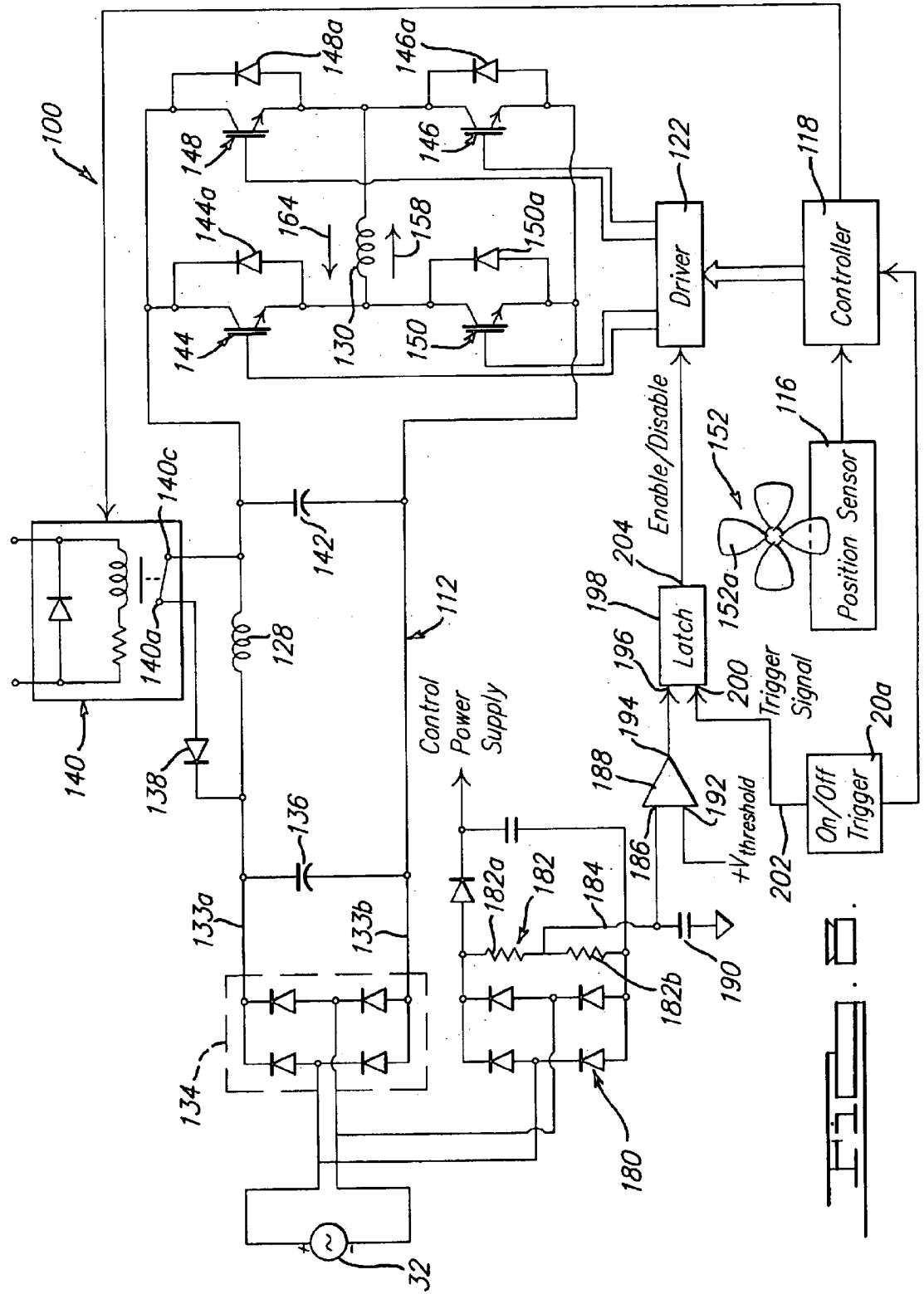

EXCITATION CIRCUIT AND CONTROL METHOD FOR FLUX SWITCHING MOTOR

CROSS REFERENCE TO RELATED APPLICATION

This application is a continuation-in-part application of U.S. Ser. No. 10/213,777, filed Aug. 6, 2002 now abandoned, presently pending, which claims priority from U.S. provisional application Ser. No. 60/310,382, filed Aug. 6, 2001, the entire contents of which are hereby incorporated by reference into this application.

FIELD OF THE INVENTION

The present invention relates to excitation circuits for electric motors, and more particularly to an excitation circuit and a control method for a flux switching motor to control the startup and operation of the motor.

BACKGROUND OF THE INVENTION

Flux switching motors are characterized by an unwound, salient pole rotor and two sets of fully pitched windings on the stator. One of these sets of windings, the field, carries substantially unidirectional current. The other set, the armature, is excited by bidirectional current, the polarity of which is determined by the rotor position.

Flux switching motors may be advantageously used in a variety of applications involving large household appliances and power tools such as table saws, mitre saws and other tools requiring greater than a fractional horsepower output. Flux switching motors are also highly advantageous for use in power tools such as saws because of the lack of brushes and the conventional commutator that is used with universal motors. The lack of brushes and mechanical contact between the brushes and a commutator allows a sealed motor to be constructed which is highly immune to dust and dirt which could otherwise affect operation of the brushes and commutator of a conventional universal motor. Such a motor also has a longer life and is much less likely to require periodic repair and/or maintenance because of the lack of wear and tear that would normally be present when a commutator and brushes are required for commutating the motor.

With flux switching motors, it has been common to commutate such motors electronically through the use of a pair of electronic switches. The switches are controlled via some form of a controller in such a manner that the direction of current flow through one of one or more armature windings, or through different portions of a bifilar armature winding, can be controlled to commutate the motor.

Many such conventional commutation circuits have required the use of a "snubber" circuit to provide a path for current flow as the electronic switches are switched off and commutate the motor. Such a snubber circuit, however, has to dissipate a fair amount of power, which represents wasted power, each time current is switched through one of the armature windings or through portions of a single bifilar winding. The copper utilization of such a scheme is also very low.

Excitation circuits for present day flux switching motors also typically require an aluminum electrolytic capacitor to be included across the output of the rectifier portion of the circuit to create a steady dc voltage and to handle the transients created while commutating the motor. However, without the aluminum electrolytic capacitor, typically referred to as a "bulk" capacitor, starting of a flux switching motor from rest may be very slow and non-uniform. Additionally, without such a bulk capacitor, it can take an unacceptably long time for the motor to reach its operating speed. In many applications, such as with power tools such as table saws or mitre saws, it would be undesirable for the user to have to wait several seconds or more before the motor reached its operating speed before the user could be able to use the tool.

Such bulk capacitors, however, also contribute to a low power factor, typically 0.75–0.70, which reduces the power that the motor can draw from a current protected branch circuit. Bulk capacitors are also relatively large and take up a fair amount of space on a printed circuit board, in addition to having life constraints (typically about 2,000 hours). They also are prone to failure from vibration, and therefore are not especially well suited to use in power tools. Still further, bulk capacitors can not mitigate the effects of harmonics into the AC source. While this is presently not a serious consideration in the United States, the introduction of harmonics into an AC source in Europe is a very serious consideration and one factor that must be considered when designing an excitation circuit for a motor to be used in Europe.

It would therefore be highly desirable to provide an excitation circuit for a flux switching motor which provides for the recirculation of current through the armature winding using an arrangement of a plurality of electronic switches and a switching control scheme to electronically commutate the motor. It is a related object to eliminate the need for a conventional snubber circuit through the use of the just-described switching control scheme and arrangement of switches.

It is still another object of the present invention to provide an excitation circuit for a flux switching motor which makes use of a relatively small, film capacitor across the output of the rectifier portion of the excitation circuit, rather than the traditional bulk capacitor. The use of a film capacitor, rather than the traditional aluminum electrolytic capacitor, would significantly improve the power factor of the circuit in addition to significantly reducing harmonics that might be introduced back into the AC source by the circuit. It would also positively contribute to the mitigation of EMI (Electromagnetic interference).

It is still another object of the present invention to provide an excitation circuit for a flux switching motor which makes use of a switching circuit which can be controlled to effect reverse commutation of the armature winding of the motor, and thus bring the motor to a quick stop when the motor is turned off. Such a feature would also be highly desirable when a flux switching motor is used in various power tools such as table saws, mitre saws, rotary hammers, etc.

Still another consideration when any form of electric motor is used with a power tool such as a saw, drill, sander, router, etc., is inadvertent starting of the power tool if the user has his/her finger on the on/off switch (e.g. the on/off trigger) when the tool is initially plugged in to an AC power source. In this instance, if the user is not aware that he/she is engaging the on/off switch while plugging a power cord of the tool into an A C power outlet, the sudden starting of the motor could startle the user. While an electronic controller for electronically commutating the motor can be used to monitor for the position of the on/off switch of the tool when AC power is first applied, it would be even further desirable to provide a separate switch monitoring circuit for such a purpose. Accordingly, if the electronic controller were to malfunction and not sense that the on/off switch was in the "on" position when AC power is first applied to the power tool, the independent switch position monitoring circuit would still be able to detect this condition.

SUMMARY OF THE INVENTION

The above and other objects are provided by an excitation circuit for a flux switching motor in accordance with a preferred embodiment of the present invention. The excitation circuit includes a switching circuit comprising a plurality of electronic switching devices configured in an H-bridge arrangement with an armature winding of the flux switching motor. At least selected ones of the electronic switches have a bypass component, such as a diode, to enable recirculation of armature current during commutation of the motor. This eliminates the need for a conventional snubber circuit and improves the torque/speed performance of the motor.

The excitation circuit further includes a film capacitor, rather than the conventional bulk capacitor, across the output of a rectifier portion of the circuit. The film capacitor significantly improves the power factor of the circuit, while also reducing the harmonics that are seen by the AC source powering the excitation circuit.

The excitation circuit also includes a controller for controlling the switching of the electronic switching devices. In one preferred form, the controller comprises a microprocessor which implements a pulse width modulation (PWM) control scheme, in combination with single-pulse control, for controlling the duty cycle of switching signals applied to the electronic switches. The use of the controller with a PWM control scheme further allows varying torque/speed profiles to be implemented such that the performance characteristics of a single flux switching motor may be used in different applications with absolutely no modifications to the motor itself. Modifications only to software used with the controller allow the torque/speed profile(s) of the motor to be tailored to achieve optimum performance of the motor for the specific tool, or tools, with which the motor will be used.

In an alternative preferred embodiment the present invention incorporates an independent on/off switch monitoring circuit for monitoring if the on/off switch of the power tool that the system is implemented with is in the "on" position when AC power is first applied to the power tool. If the on/off switch (e.g. the on/off trigger) is being held in the "on" position when AC power is first applied, this condition is sensed virtually immediately and a latch circuit is used to disable the power switching components used to electrically commutate the motor. In this instance, the user is required to release the on/off switch and then reengage the switch before the motor can be powered on. If the switch is not being engaged when power is applied, then the motor can be commutated without any interference from the monitoring circuit.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a simplified schematic drawing of the excitation circuit of FIG. 1 showing the H-bridge switching circuit in greater detail;

FIG. 7 is a graph of the PWM duty cycle modulation in relation to AC line voltage during startup; and FIG. 8 is a simplified schematic representation of a no-volt release circuit for ensuring that power will not be applied to the motor of the power tool in the event the on/off switch (e.g., on/off trigger) of the will tool is being held closed when the AC power cord of the tool is initially coupled to an AC power source.

DETAILED DESCRIPTION OF THE PREFERRED EMBODIMENTS

The following description of the preferred embodiment(s) is merely exemplary in nature and is in no way intended to limit the invention, its application, or uses.

Figure 1:
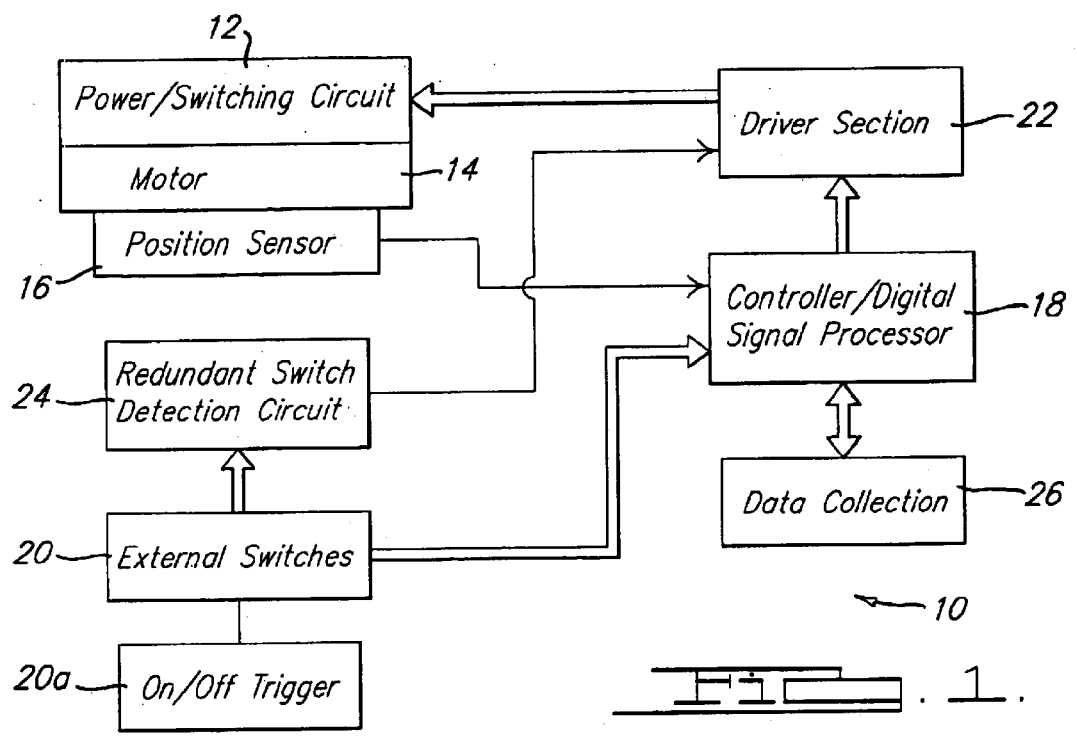
FIG. 1 is a simplified block diagram of an excitation circuit in accordance with a preferred embodiment of the present invention.

Referring to FIG. 1, there is shown an excitation system 10 in accordance with a preferred embodiment of the present invention. The system 10 generally comprises a power switching circuit 12 in communication with a flux switching motor 14. The motor 14 comprises a conventional flux switching motor having a stator with a plurality of poles, and in one preferred form a plurality of four poles, a fully-pitched field winding and a fully pitched armature winding. The number of turns of the field and armature windings may vary but in one preferred form the motor 14 comprises a field winding having 40 turns per coil and an armature winding having 20 turns per coil. In one preferred form, the stator has a pair of consequent poles as a result of arranging the armature winding in two parallel portions.

The motor 14 also has a rotor, the rotational position of which is monitored by a position sensor 16. The sensor 16 output signals are applied to a controller 18, such as a microprocessor. A plurality of mechanical switches can be used to input information to the controller 18 to signal to the controller various events, such as the actuation of an on/off trigger switch 20a for turning on the motor 14. The controller generates switching signals which are applied to a driver circuit 22. The outputs from the driver circuit 22 are used to control switching components of the power/switching circuit 12 to thus electronically commutate the motor 14.

It is anticipated that the system 10 will be used with a wide variety of power tools, and one specific implementation is in connection with a combination table saw/mitre saw. In this implementation, typically a plurality of external switches are included to signal to the controller 18 whether the motor 14 is being used (i.e., positioned) in a table saw mode or in a mitre saw mode. From this information, the controller 18 can modify its output signals to the driver section 22 such that the driver section can control commutation of the motor 14 in a manner tailored to provide a specific desired torque/speed performance curve.

A redundant switch detection circuit section 24 is preferably included for monitoring actuation of the external switches 20. This circuit 24 provides a signal to the driver section 22 indicative of the actuation of one or more of the external switches, or the deactivation of one or more of the external switches. The driver section 22 receives the proper signal(s) from the controller 18, as well as from the redundant switch detection circuit 24, before the driver section 22 can generate the appropriate signal to turn on the motor 14. Accordingly, the redundant switch detection circuit 24 acts as a safeguard to assure that any malfunction of the controller 18 cannot, by itself, cause a signal to be transmitted to the driver section 22 which would in turn power on the motor 14. An optional data collection circuit 26 is preferably employed for storing tool use data in an EEPROM.

Figure 2A:
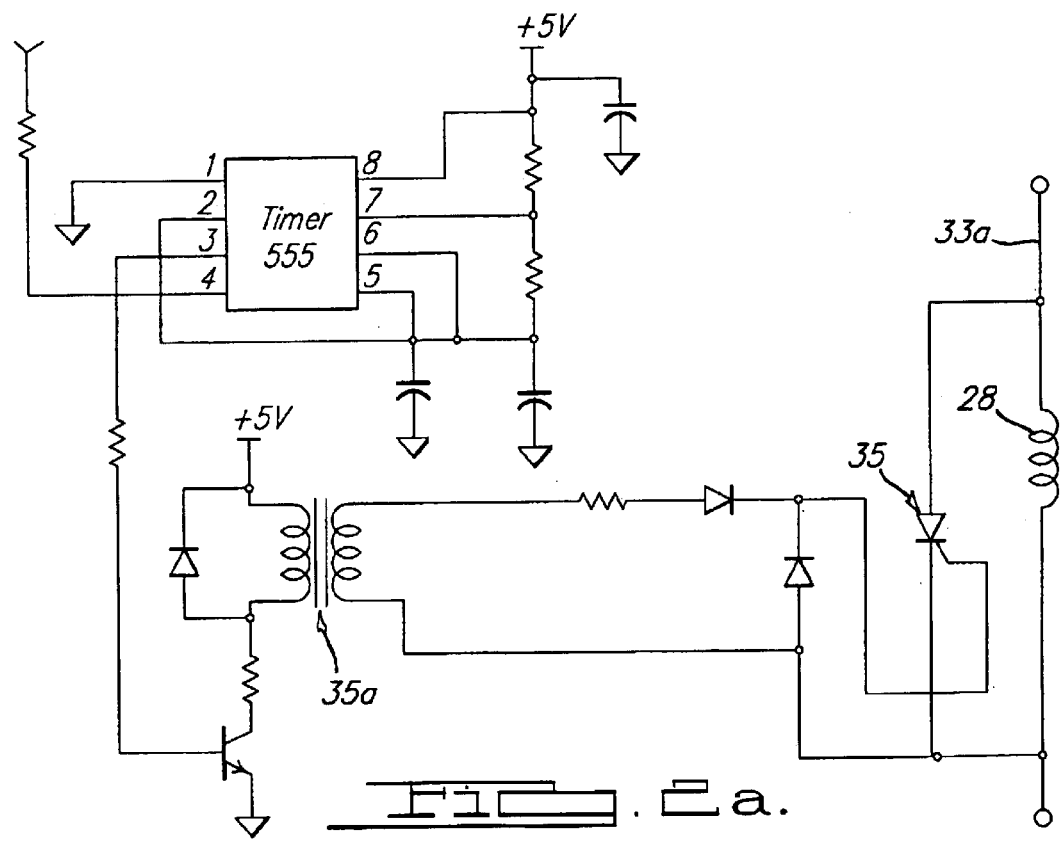
FIG. 2a is a schematic drawing of an alternative circuit for removing the diode from across the field winding.

Referring to FIG. 2, the power/switching portion 12 of the system 10 is shown in greater detail. It will be appreciated that the schematic of FIG. 2 does not include the redundant switch detection circuit 24, the external switches 20, the driver section 22 or the data collection circuit 26. The motor 14 is indicated in highly simplified form by a field winding 28 and an armature winding 30. An AC power source 32 provides an AC input power to a full wave bridge rectifier circuit 34. A film capacitor 36 is coupled across the DC rails 33a and 33b so as to be coupled across the output (i.e., DC side) of the rectifier 34. Film capacitor 36, in one preferred form, comprises a metallized polypropylene film capacitor having a capacitance of preferably between about 10 μfd–15 μfd, and more preferably about 12.5 μfd. The value is dictated by EMI tests and harmonics tests.

A start-up diode 38 is coupled across the field winding 28 via a pair of switch contacts 40a on an output side of a relay 40. It will be appreciated that start-up diode 38 and relay 40 could be replaced by a thyristor or other form of suitable semiconductor gated by an optical switch with a triac output or thyristor output, or a pulse transformer. An armature energy recovery capacitor 42 is also coupled across the DC rails 33a and 33b. The armature energy recovery capacitor 42 preferably has a value between about 10 μfd–15 μfd, and more preferably about 12.5 μfd.

The diode 38 can be used in combination with the relay contacts 40a to keep or remove the diode from the circuit, based on whether the motor operation is in start-up mode or in run mode. An alternative implementation is the use of a thyristor 35 in place of a diode, and a pulse transformer 35a (FIG. 2a) in place of a relay. Both implementations function essentially the same way.

With further reference to FIG. 2, the power/switching section 12 includes a plurality of electronic switch devices 44, 46, 48 and 50 connected in an H-bridge fashion with armature winding 30. The electronic switches 44–50 each may comprise any form of suitable electronic switching device, but in one preferred form the switches 44–50 each comprise an Insulated Gate Bipolar Transistor (IGBT). It will be noted also that each of the switches 44–50 include a respective diode 44a–50a, generally understood as a "free wheeling" diode. These free-wheeling diodes 44a–50a facilitate the recirculation of armature energy during startup of the motor 14. This feature will be described in greater detail momentarily.

Initially, it should be understood that switches 44–50 are controlled as two pairs: a first pair comprising switches 44 and 46, and a second pair comprising switches 48 and 50. A gate of each of the switches 44–50 is coupled to the controller 18 via the driver section 22. Each of the switches 44 and 48 are turned on using a pulse width modulation (PWM) control scheme, or by single-pulse control, by the controller 18 depending on the sensed motor speed. Switches 46 and 50 are controlled through only a single pulse control scheme.

The controller 18 receives signals from the position sensor 16 that indicate the rotational position of a rotor 52 of the motor 14. In one preferred form the position sensor 16 comprises an optical sensor. One optical sensor which is especially well suited for use with the system 10 is a slotted optical switch that is commercially available from Optek Technology, Inc. of Carrollton, Tex. The position sensor 16 can be formed by a number of different components, for example, a magnetic switch, that can indicate the rotor position.

Figure 3:
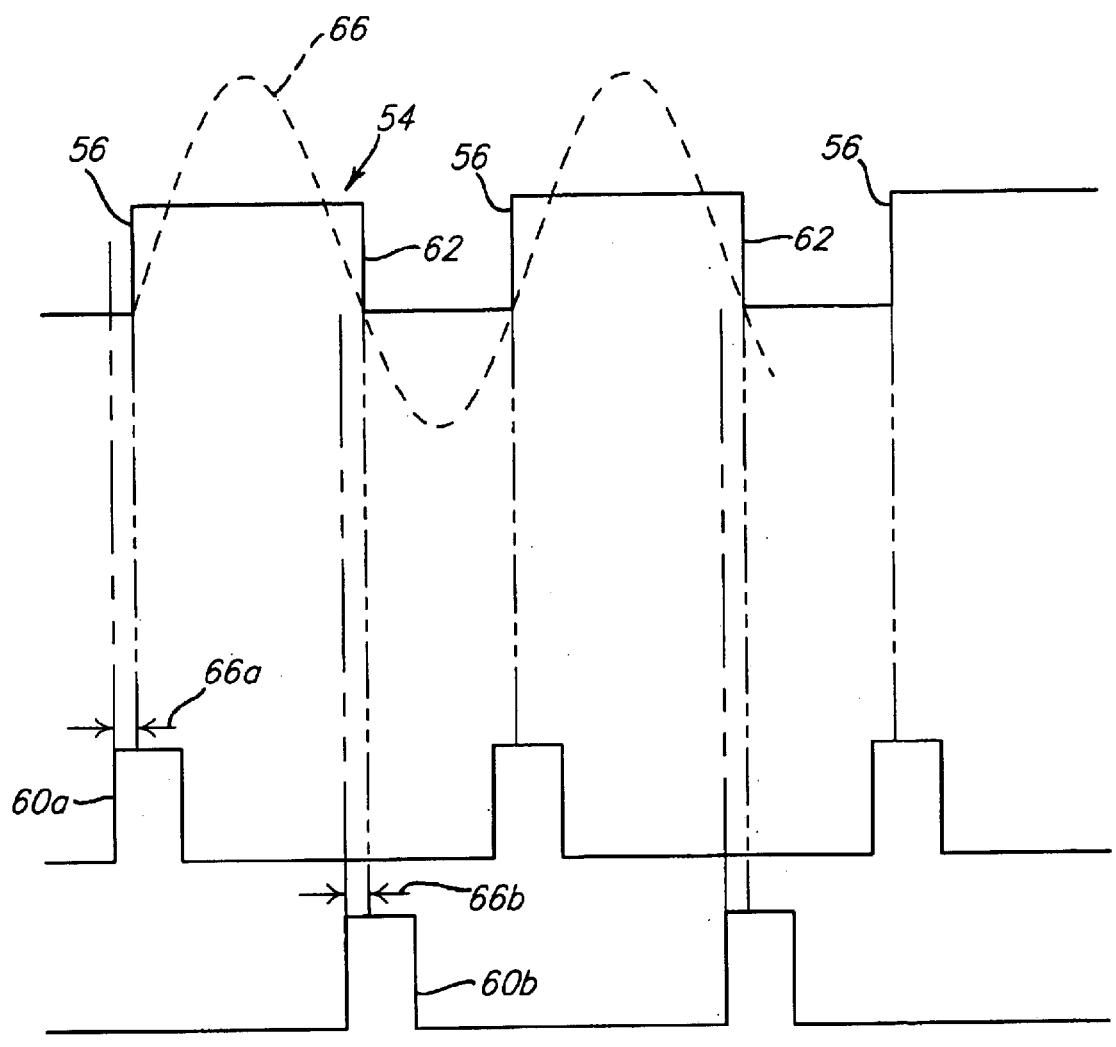
FIG. 3 is a diagram of the position sensor output signal and the back EMF that is generated by the motor, and also illustrating the advance in the PWM switching signals that is employed.

With brief reference to FIG. 3, a waveform 54 is illustrated which is produced by the sensor 16 as it senses the position of each pole 52a of the rotor 52 shown in FIG. 2. The detection of each pole 52a produces a positive-going leading edge 56 of a generally square wave pulse. Four pulses are produced for each 3600 revolution of the 4-pole rotor 52. Therefore, the width of each pulse will be approximately 45 mechanical degrees for a 4-pole motor. It will be appreciated then that the frequency of waveform 54 will increase and decrease in accordance with the sensed motor speed.

Operational Modes

The system 10 implements several operational modes that are executed sequentially when the motor 14 is first powered on to reach the rated motor speed, which is preferably about 15,000 rpm, without drawing excessive current during start-up. These four modes will be discussed in the following subsections 1–4.

1. Initial Start-Up Mode (Approximately 0–450 rpm)

Referring now to FIGS. 2 and 4, during initial startup of the motor 14, the AC source 32 provides AC power, in one preferred form, a 230 volt AC signal, to an input side of the rectifier 34. The rectifier 34 produces a rectified AC signal across the DC bus lines 33a and 33b. When the motor 14 is first powered on, if the sensor output waveform 54 is at a logic "1" (i.e., high) level, then the controller 18 causes switches 44 and 46 to be turned on to allow current flow through the armature winding 30 in the direction of arrow 58. The rotor 52 is preferably pressed on or otherwise coupled to an output shaft of the motor 14 and aligned in relation to the sensor 16 such that the back EMF produced by the armature winding 30 will be known to be positive. Thus, to achieve positive torque, current will be required to flow through the armature winding 30 in the direction of arrow 58.

When the motor 14 is initially powered on, the startup diode 38 is placed across the field winding 28 by activation of the relay 40 closing the switch contacts 40a, in response to a signal from the controller 18. This provides a path for the recirculation of field current through the field winding 28 so that the field current does not become discontinuous during the startup phase of operation. As will be explained further in section 4, once the motor 14 is operating at a speed of at least about 15,000 rpm, however, the startup diode 38 is removed from the circuit 12 by opening contacts 40a, which deactivate the relay 40. This ensures optimal performance of the motor, by resulting in high efficiency and higher output power.

Figure 4A:
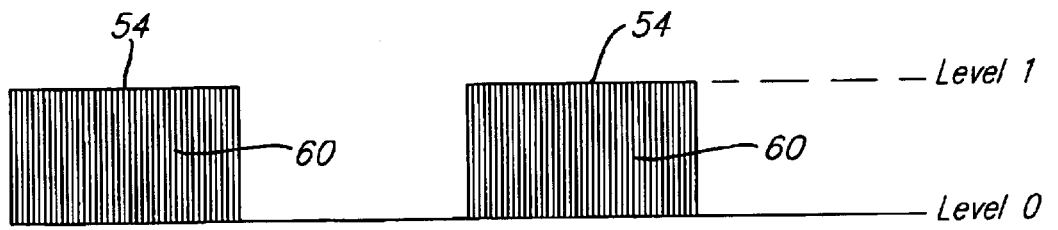
FIGS. 4a–4d are graphs of the PWM switching signal in relation to the rotor position sensor output waveform, illustrating in simplified fashion the change in duty cycle as a function of motor speed during the various start-up modes of operation.
Figure 4B:
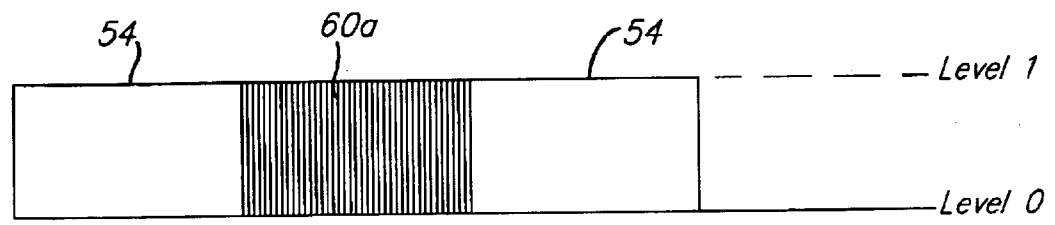

During the Initial Start-Up Mode, when waveform 54 is sensed to be at a logic 1 level, a PWM switching signal 60 (FIG. 4*a*) is applied to only switch 44. Switch 46 is maintained in an "on" state continuously by the controller 18. Similarly, when switch pair 48 and 50 is switched on by the controller 18 (when waveform 54 is logic level 0 as shown in FIG. 4*b*), it is only switch 48 that receives the PWM switching signal 60; switch 50 is maintained "on" continuously by the controller 18 until switch pair 48 and 50 is turned off by the controller. This scheme is carried out through all of the start up modes described herein.

Figure 5:
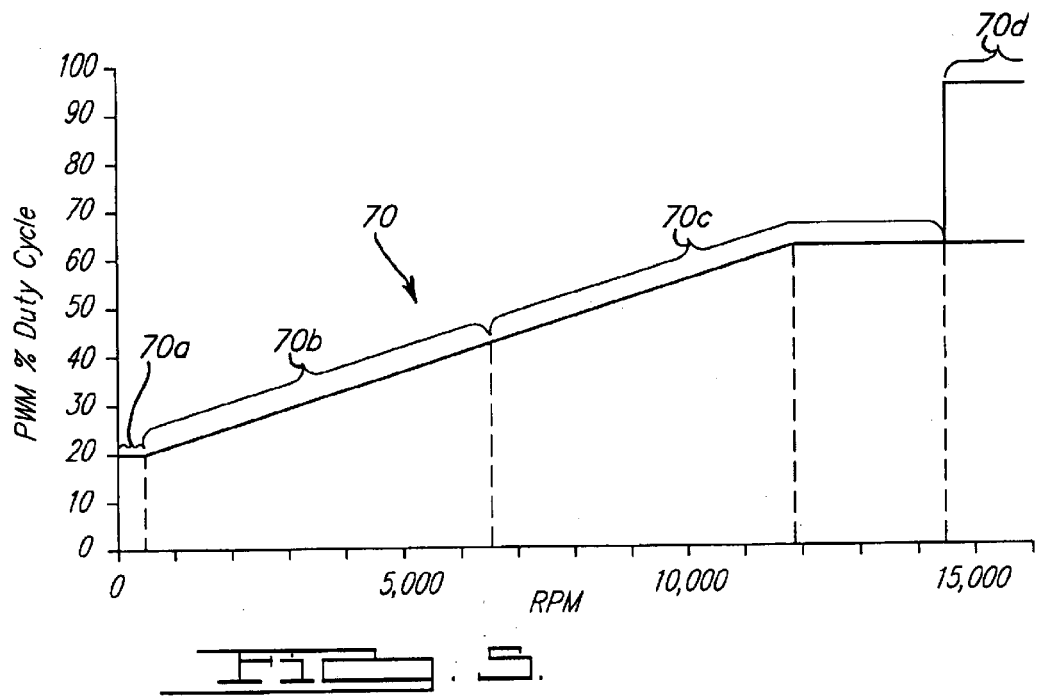
FIG. 5 is a graph of an exemplary PWM duty cycle profile employed by the system of the present invention in relation to the motor speed.

Throughout all of the start up modes described herein, the frequency of the PWM switching signal 60 applied to the switches 44 and 48 is held at preferably about 5 KHz (period 200 $\mu$sec); it is only the duty cycle of the PWM switching signal 60 that is modified (as noted in FIG. 5). It will also be appreciated, however, that this 5 KHz PWM switching signal 60 could be increased or decreased in frequency to suit a specific application.

During the Initial Start Up Mode (i.e., between about 0–450 rpm), the motor speed will be too low to be reliably determined by the controller 18. As such, the PWM switching signal 60 has a constant (i.e., fixed) duty cycle during this motor speed range that is preferably in the range of about 10%–25%, and more preferably about 20%. This is illustrated in FIG. 5 by portion 70*a* of curve 70, which is shown having a fixed duty cycle of 20%. FIG. 4A represents the control signals at a motor speed of approximately 200 rpm. Thus, waveform 54 has a period of 75 msec. During the logic level 1 portion of waveform 54 (about 37.5 msec.), approximately 188 PWM cycles are sent to the gate of switch 44. As indicated by FIG. 5, the duty cycle of those PWM cycles is only approximately 20% at this low motor speed, but given the scale of FIG. 4A the duty cycle of the PWM pulses is not discernable.

With further reference to FIG. 4*a*, the PWM switching signal 60 is also controlled in relation to the square wave position sensor output waveform 54 produced by the position sensor 16. The PWM switching signal 60 is controlled such that it is applied within an envelope formed by each logic "1" level pulse produced by the position sensor 16. By the term "envelope" it is meant that portion (i.e., period) of the "on" time for the position sensor output waveform 54 that the PWM switching signal 60 is applied. Thus, in FIG. 4*a*, the PWM switching signal 60 can be seen to have an envelope that matches the period of each "on" pulse of the position sensor output waveform 54. Note that FIG. 4*a* shows only the PWM signal for top switch 44. The PWM signal applied to top switch 48 occurs when waveform 54 is at a logic level 0 and is shown in FIG. 4*b*.

An additional, important feature of the start up mode is a reverse "kick" (i.e., pulse) that is provided to the motor 14 whenever the motor is switched on from a non-moving (i.e., rest) condition. As explained above, the controller 18 initially determines, from the position sensor output waveform 54, which pair of switches 44,46 or 48,50 need to be controlled to start rotation of the motor 14. In the example above, the controller 18 initially determines that switches 44 and 46 need to be pulsed. Accordingly, just prior to pulsing switch 44 on and off and turning on switch 46 to begin rotation of the motor 14, the controller 18 will apply at least one pulse to the motor 14 by turning on the pair of switches 44,46 or 48,50 opposite to those that would ordinarily be turned on in view of the sensed rotor position. Thus, in this example, since the waveform 54 is at a logic high level at startup, the controller 18 instead pulses switches 48 and 50 on for preferably 8–10 milliseconds. This provides a very brief reverse pulse to the motor 14 to ensure starting of the motor 14 in the event the motor 14 is positioned at a point of rotation that would otherwise make starting difficult. This momentary reverse pulse is applied every time the motor 14 is first powered on via the on/off trigger switch 20*a*.

Maintaining switch 46 turned on continuously when applying the PWM switching signal 60 to switch 44 further allows a recirculation of armature current through switch 46, through free wheeling diode 50*a* of switch 50, and through the armature winding 30 when the switch 44 is momentarily turned off during application of the PWM switching signal 60. Similarly, when switch pair 48 and 50 is being turned on by the controller 18, recirculation of armature current is provided through switch 50, through free-wheeling diode 46*a* of switch 46, and through the armature winding 30 when switch 48 is momentarily turned off during application of the PWM switching signal 60.

Furthermore, after every transition of position sensor output waveform 54, recirculation of armature current is employed for several cycles of the PWM switching signal 60 when the signal 60 is subsequently applied to one of switches 44 or 48. Thus, when the next negative-going edge of waveform 54 is detected, switch 44 is turned off, its associated switch 46 is left on while switch 50 is then turned on. Switches 46 and 50 both remain turned on for a specific amount of time, preferably 100 $\mu$s at which point switch 46 is turned off and switch 48 is then turned on. When the next positive-going edge of waveform 54 is detected, switch 48 is turned off, switch 50 is left on and switch 46 is then turned on for a specific amount of time, preferably 100 $\mu$s at which point switch 50 is again turned off and switch 44 is turned on. This pattern continues as long as armature current recirculation is desired. This recirculation of armature current allows for a more uniform and quicker startup of the motor 14 in the absence of a bulk dc capacitor. Because of the recirculation of armature current, the H-bridge switch arrangement requires no snubber circuit. The recirculation of armature energy also contributes significantly to the increased efficiency of the motor 14.

As the initial start up Mode continues, when the controller 18 detects that the waveform 54 is transitioning to a logic zero level, as indicated by trailing edge portions 62 of waveform 54, then switches 44 and 46 are turned off by the controller and switches 48 and 50 are turned on. Again, recirculation of armature current is allowed for several cycles of the PWM switching signal 60 before the signal 60 is applied to the switches 44 and 48. Switch 48 is then pulsed on a plurality of times while position sensor output waveform 54 is at a logic low level. When switch 48 is pulsed on, this causes current flow through switch 48, through the armature winding 30 in the direction of arrow 64, and through the switch 50. It will also be appreciated that at the instant that the switch 48 is pulsed off, the free wheeling diode 46*a* of switch 46 permits recirculation of armature current therethrough.

The controller 18 makes the determination to switch off switches 44 and 46 and to switch on switches 48 and 50 when it detects the transition to a logic zero level portion of the waveform 54. When waveform 54 is at a logic zero level, this indicates that the back EMF of the motor 14 is now negative, and that current flow in the direction of arrow 64 will be required to again obtain positive torque from the motor 14. The back EMF is indicated in FIG. 3 by waveform 66 which is superimposed over position sensor output waveform 54. Once another leading edge 56 of the waveform 54 is detected by the controller 18, the controller turns off switches 48 and 50 and again energizes switches 44 and 46, with switch 44 then being pulsed on a plurality of times by the PWM switching signal 60 in accordance with the predetermined start-up PWM duty cycle (i.e, preferably about 20%). This process is repeated continuously until the motor 14 reaches a predetermined speed that can be determined reliably by the controller 18 (i.e., above about 450 rpm).

The recirculation of armature energy during the startup phase also helps to control the voltage across the armature energy storage capacitor 42. With recirculation of the armature energy, the voltage across capacitor 42 can be maintained below 600 volts when a 230 volt AC input signal is being utilized. The use of film capacitors 36 and 42, together with the field winding 28, also forms a pi filter which helps to reduce EMI and transients that might otherwise be introduced into the AC source 32.

2. First Intermediate Start Up Mode

Figure 4C:
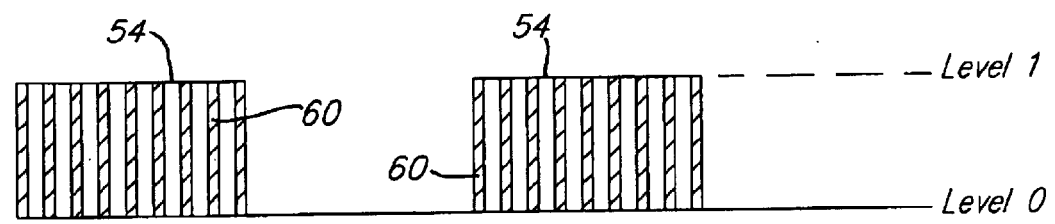

The First Intermediate Start Up Mode follows the Initial Start Up Mode and extends from about 450 rpm to preferably between about 6000 rpm–7500 rpm, and more preferably about 6700 rpm. During this phase of the start up sequence, the duty cycle of the PWM switching signal 60 is increased generally linearly by the controller 18, in relation to motor speed, from about 20% to about 40%, as indicated by portion 70b of graph 70 shown in FIG. 5. During this intermediate phase, in which the motor 14 is still increasing in speed but is beyond about 450 rpm in speed, recirculation of armature energy is employed via the switching of switches 44 and 48. FIG. 4C illustrates the control signals at a motor speed of approximately 4000 rpm. At 4000 rpm the period of waveform 54 is approximately 3.75 msec. Thus, the period of the logic level 1 portion of waveform 54 is approximately 2 msec. During the logic level 1 portion of waveform 54 approximately 9 PWM cycles are applied to the gate of switch 44. The duty cycle of those PWM cycles is approximately 40% (FIG. 5).

3. Second Intermediate Start UP Mode

Figure 4D:
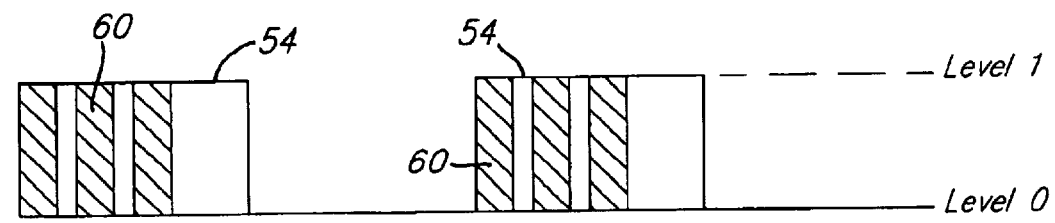
Figure 6:
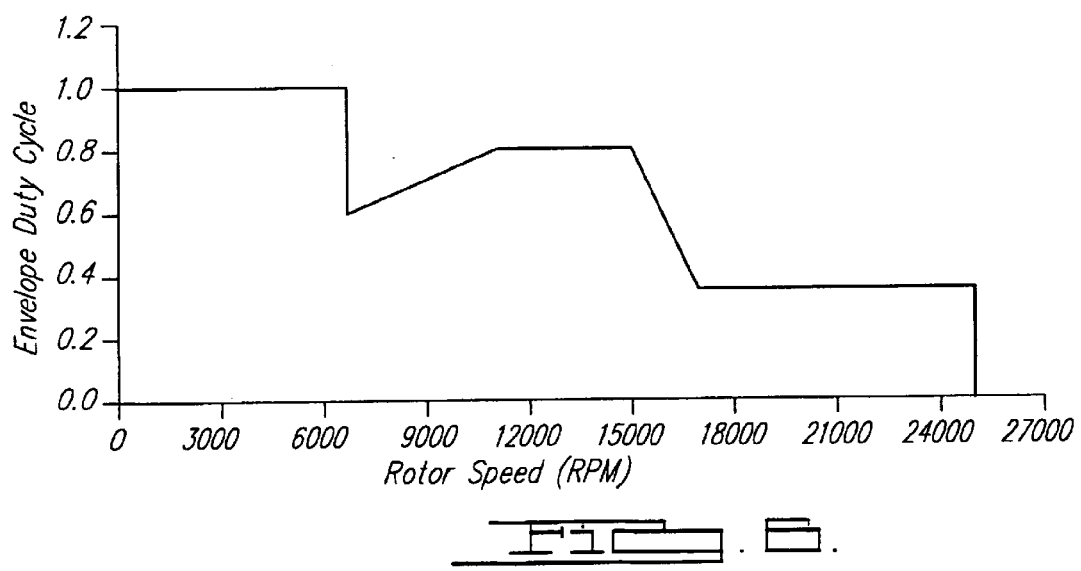
FIG. 6 is a graph of the overall envelope of the PWM duty cycle relative to the motor speed.

The Second Intermediate Start Up Mode follows the First Intermediate Start Up Mode from a motor speed of preferably about 6700 rpm to preferably about 14,500 rpm. As the motor speed reaches about 6,700 rpm, the controller 18 alters the envelope (as represented by waveform 54) of the PWM switching signal 60. Specifically, when the 6700 rpm speed threshold is reached, the envelope for the PWM switching signal is reduced, in step fashion, to a fraction of the period of each "on" pulse of the position sensor output waveform 54. The numerical value of the ratio of the width of the new envelope to the width of the "on" pulse of waveform 54 is a function of speed as shown in FIG. 6. This reduction of envelope is illustrated in FIG. 4d where it can be seen that PWM switching waveform 60 is contained within a smaller envelope than that defined by the "on" period of one pulse of the position sensor output waveform 54. FIG. 4D illustrates the control signals at a motor speed of approximately 10,000 rpm. At 10,000 rpm the period of waveform 54 is approximately 1.5 ms. Thus, the period of the logic level 1 portion of waveform 54 is approximately 0.8 ms, but the duty cycle control (FIG. 6) further limits that to about 0.6 ms. Thus, during the logic level 1 portion of waveform 54 approximately 3 PWM cycles are applied to the gate of switch 44. The duty cycle of those PWM cycles is approximately 55% (FIG. 5).

During this phase of the start up sequence, the duty cycle of the PWM switching signal 60 continues to increase generally linearly with the motor speed from about 40% at 6700 rpm to a maximum of about 60% at about 11,000 rpm. Between about 11,000 rpm and 14,500 rpm, the duty cycle of the PWM switching signal 60 is held constant, as indicated by portion 70c of graph 70 of FIG. 5. However, the envelope for the PWM switching signal 60 is continuously increased from about 60% to about 80% of the period of each "on" pulse of the position sensor output waveform 54, as shown in FIG. 4d and FIG. 6. Thus, by the time the motor speed reaches about 14,500 rpm, the duty cycle of the PWM switching signal 60 is at a maximum of about 60% and the envelope for the signal 60 is at about 80% of the pulse width of each "on" pulse of the position sensor output waveform 54. The recirculation of the armature energy is employed until about a speed of 10,000 rpm and then discontinued.

4. Final Start Up Mode (Phase Lock Mode of Operation)

Figure 4E:
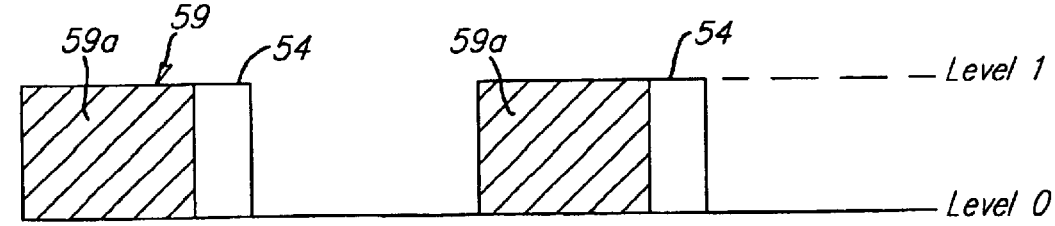
FIG. 4e is a graph of the single pulse switching signal in relation to the motor speed.

The Final Start Up Mode covers the motor speed range from about 14,500 rpm to rated motor speed. Rated motor speed may vary depending upon the specific tool the motor 14 is being used with, but is preferably between about 15,000 rpm and 17,000 rpm. At the beginning of this speed range, a phase lock mode of operation is initiated and continued up to rated motor speed. During phase lock operation, single pulse control over the switches 44–50 is employed. By "single pulse" control it is meant that no PWM switching signal is employed, but rather that a single, continuous "on" pulse is provided during the period of each "on" pulse of the position sensor output waveform 54. This is illustrated in FIG. 4e and FIG. 5. FIG. 4e shows a single pulse switching signal 59 comprised of pulses 59a each having an "on" duration corresponding to an envelope of about 80% of each "on" pulse of the position sensor output waveform 54. Between about 14,500 rpm and rated motor speed, the duration of the pulses 59a is maintained at this 80% envelope value as indicated in FIG. 4e. At about 15,000 rpm, the start up diode 38 is switched out of the system Summary Of Start-Up Modes Throughout the four above-described start up modes, it will be appreciated that the PWM switching signal 60 or the single pulse switching signal 59 are applied to one or the other of switches 44 or 48. When switches 46 and 50 are each turned on, they always receive single pulses corresponding in "on" duration to the "on" duration of each pulse of position sensor output waveform 54. The only exception is upon the initial application of power to the motor 14.

It will be appreciated that the specific tool that the motor 14 is being used with can have a bearing on the optimal motor performance curve that is selected for use. For example, if the motor 14 is being used with a table saw, then a rated motor speed of between about 15,000–17,000 rpm, and more preferably about 17,000 rpm, will typically be selected. If the motor 14 is used with a mitre saw, then the preferred rated motor speed will typically be between about 20,000–25,000 rpm, and more preferably about 22,500 rpm. The precise duty cycle/motor speed relationship will also vary with the specific tool that the motor 14 is used with. While the system 10 described herein uses a phase lock threshold of about 14,500 rpm, it will be appreciated that a different motor speed could be set as the phase lock speed threshold. However, it is preferable to wait until the motor speed has reached a speed of at least around 7000 rpm before entering the phase lock mode of operation to avoid the source inductive voltage effects that could result in transient spikes on the AC input source. The motor 14 can be loaded at any given point of motor start up operation, including well before the system 10 enters the phase lock mode of operation.

By controlling the duty cycle of the PWM switching signal 60, the envelope during which it is applied, and the precise speed at which phase lock operation is entered, a wide variety of motor torque profiles can be implemented. These varying motor torque profiles can be used to tailor the operation of the motor to specific tools such as table saws, mitre saws, and a wide variety of other motor-driven tools.

Braking Action Using Reverse Commutation

An additional feature of the system 10 is that when the motor 14 is turned off by a user, reverse commutation of the motor 14 is employed to bring the motor to a quick stop. As will be appreciated, the ability to quickly stop a motor is an important consideration with many power tools, and particularly with devices such as table saws and mitre saws.

The system 10 makes use of a fixed PWM frequency and a fixed duty cycle for the PWM switching signal 60 applied to the switches 44–50 during braking operation. With reference to FIG. 3, during braking, when the controller 18 senses that position sensor output waveform 54 has transitioned to a logic high level (indicated by leading edge 56), requiring current flow in the direction of arrow 58 (FIG. 2) to maintain positive motor torque, it turns on switches 48 and 50. This causes current flow in the direction of arrow 64 (FIG. 2), which results in a negative motor torque. During this period relay 40 is used to switch the diode 38 back into the system 10 to help keep the braking time to a minimum (typically less than three-four seconds). When the trailing edge 62 of each pulse of waveform 54 occurs, requiring current flow through the armature winding 30 in the direction of arrow 64 to maintain a positive motor torque, the controller 18 turns off switches 48 and 50 and turns on switches 44 and 46. This causes current flow in the direction of arrow 58 and produces a negative motor torque during this period of rotor rotation.

It will be appreciated that other PWM schemes could be used in the braking mode with similar results. For example, variable duty cycle PWM pulses could be used at a fixed frequency. The PWM pulse width could alternatively be generated as a function of motor speed. Still further, the PWM duty cycle profiles could be altered (e.g., dome vs. linear) to achieve quick stopping of the motor. In all of these instances, the limiting factor on the duty cycle profiles implemented during braking is the voltage across the armature energy recovery capacitor 42. The presence of film capacitor 36, which is of a higher voltage rating (preferably 600 volts) instead of the traditional aluminum electrolytic capacitor, makes the braking scheme of the present invention very aggressive. The motor 14, when used to drive a saw with a 12 inch (30.48 cm) blade, can be brought to a stop from a speed above its phase lock threshold speed in less than about 4 seconds.

Advancing Rotor Position Sensor Signal For Optimum Performance

With further reference to FIG. 3, to obtain maximum performance out of the motor 14, the signal 54 from the position sensor 16 has to be advanced, either physically or through software in the controller 18, by a small degree to establish current in the armature winding 30 by the time the back EMF begins to be generated by the motor 14. The back EMF is represented by waveform 66 in FIG. 3. Waveforms 60*a* and 60*b* represent the PWM switching signals used to control the switches 44,46 and 48,50, respectively, with the advance being applied. Intervals 66*a* and 66*b* represent the degree of advance applied to PWM switching signals 60*a* and 60*b*, respectively. Advancing the pulses of the PWM switching waveforms 60*a* and 60*b* by a small degree 66*a* allows a current in the direction of arrow 58 (FIG. 2) to be established through the armature winding 30 by the time the back EMF begins to become positive. Advancing the pulses of PWM switching signal 60*b* in accordance with interval 66*b* allows a current in the direction of arrow 64 (FIG. 2) to be established in the armature winding 30 by the time the back EMF becomes negative.

In the instance that the advance angle is obtained through physical alignment of the position sensor 16 relative to the rotor 52, with respect to the armature winding back EMF, there is the possibility of the rotor 52 moving in the wrong direction when the motor 14 is first started. This might happen if the rotor 52 came to a stop, from a previous rotation, in the zone (i.e., the zone representing the advance of the rotor 52) where the back EMF doesn't agree with the sensor signal placement. One solution to this problem is to align the position sensor 16 such that it generates its positive-going pulses coincident with the zero crossing points of the back EMF waveform 66 and to incorporate the commutation advance angle in the software of the controller 18. However, the limiting factor here is the time it takes for the controller 18 to execute the period measurement. Nevertheless, it is presently preferred to implement the commutation advance through software to avoid the possibility of the momentary backwards rotation of the motor 14 at startup.

Limiting Transients During Start-Up

Another factor that needs to be considered at startup is the possibility of transient peaks being introduced to the AC source 32 when the system 10 is used with a "soft" power source whose impedance is high. When the motor 14 is started from rest, the back EMF is zero and in-rush current can be relatively large. This can result in a voltage transient peak which is more noticeable at the peaks of the AC input voltage waveform. This phenomenon could potentially be more prominent with the system 10 because of the absence of the typical bulk capacitor at the DC side of the rectifier circuit 34. These peaks can be as high as 500 volts depending on the PWM pulse width and the PWM frequency.

In order to limit the in-rush current during startup and reduce the effect of the power line impedance, two modifications to the start up modes described previously could be implemented. The first is the use of a higher PWM frequency (e.g., 20 KHz) with low starting duty cycles (e.g., about 20%), and a subsequently slower change in duty cycle with speed. The second modification would involve adjusting the duty cycle of the PWM switching signal 60 according to the AC input voltage waveform. This approach is shown in FIG. 7, wherein the AC input waveform is designated by reference numeral 72. Once reliable motor speed information is obtained by the controller 18 (typically around 450 rpm), the controller 18 could modify (i.e., reduce) the PWM duty cycle applied to the switches 44,46 and 48,50 by a percentage value based on the sensed motor speed. This duty cycle then is modulated in accordance with the AC voltage waveform 72 in such a way that the duty cycle value decreases as the AC input voltage peak point is reached, as indicated in FIG. 7. Thus, at a given motor speed, the duty cycle value at the zero crossing point of the AC input voltage waveform 72 would be at a maximum (i.e., it would not have any percentage reduction applied thereto). At either the positive or negative peak of the AC input voltage waveform, the duty cycle would be at its minimum (although not necessarily at zero percent). The multiplication factor used in reducing the duty cycle values to a minimum at the peaks of the AC input voltage waveform 72 is dictated by the transient voltage mitigation on the AC source.

Additional Operational Features

An additional feature employed during start up of the motor 14 by the system 10 is the detection of immediate movement of the rotor 52. Every time the on/off switch for the motor 14 is engaged (i.e., switched on), if the rotor position sensor 16 does not detect a change in the position of the rotor 52 (i.e., position sensor output waveform 54 doesn't change state) within the first 100 ms, then the controller 18 will not continue to commutate the motor 14. In this instance the user is required to release the on/off switch and then re-engage it. This also helps to prevent damage to the motor 14.

Another feature to protect the motor 14 involves the controller 18 monitoring the speed of the motor while loading is occurring (such as at the beginning of a cut when sawing). If the speed goes below 10,000 rpm, the controller 18 turns off the motor 14. The user is then required to release the on/off trigger 20a before the motor 14 can be re-started.

No-Volt Release Feature

A system 100 in accordance with an alternative preferred embodiment of the present invention is shown in FIG. 8. The system of FIG. 8 includes a no-volt release circuit. Essentially, the no volt release circuit functions to monitor the position of the on/off trigger 20a and to prevent starting of the motor 14 if AC power is applied to the system 10 which the on/off trigger 20a is being held. It will be appreciated that components of system 100 that are common to system 10 are denoted by reference numerals increased by 100 over those used in connection with the description of system 10. It will also be appreciated that the operation of the system 100 and its components is identical to that provided for system 10, with the exception of the operation of the no-volt release circuit that will now be described below.

The no-volt release circuit includes a full-wave bridge rectifier circuit 180 and a voltage divider circuit 182 comprised of resistors 182a and 182b. An output of the rectifier circuit 180 is coupled across the voltage divider circuit 182. The voltage divider circuit 182 is coupled via a circuit line 184 to an input 186 of a comparator 188. Also coupled to input 186 is a delay capacitor 190. A second input 192 of the comparator 188 is coupled to a reference threshold voltage (Vthreshold). An output 194 of the comparator is coupled to a first input 196 of a latch circuit 198. In one preferred form the latch circuit comprises a multiplexer. A second input 200 of the latch circuit 198 is coupled to the on/off trigger switch 20a of the power tool via a circuit line 202.

Referring further to FIG. 8, the latch circuit 198 has a "Enable/Disable" output 204. Output 204 is coupled to the driver circuit 122. As with switches 44–50, each of switches 144–150, in one preferred form, comprise insulated gate bipolar transistors (IGBTs), although any suitable power switching device(s) could be implemented. The driver circuit 122 includes a plurality of driver subsystems that each have an "enable/disable" pin (i.e., input) that is used to enable each driver subsystem for operation. For example, a logic high level signal on the enable/disable pin may turn on a given driver subsystem, while a logic low level signal will disable the given driver subsystem.

In operation, if the on/off trigger switch 20a is in the "on" position when AC power is first applied to the power tool with which the system 100 is being used, a logic low level signal will be generated on circuit line 202. The output of comparator 188 will also initially be at a logic low level. The delay capacitor 190 provides a very short time period (preferably in milliseconds) in which the latch circuit 198, the comparator 188 and other electronic components are able to fully power up before the signal at input 186 of comparator 188 reaches a maximum value.

When the comparator 188 generates a logic low level signal, the latch circuit 198 sees this logic low level signal on input 196. If at that instant the circuit line 202 is providing a logic low level signal indicating that the on/off trigger switch 20a is closed (i.e., in the "on" position), then the latch circuit 198 generates a logic level low level signal on its output 204. Put differently, the output of the latch circuit 198 is latched at a logic low level. This logic low level signal is applied to the enable/disable pin of each of the driver subsystems making up driver circuit 122. This prevents the switches 144–150 from switching and beginning to commutate the motor. Even when the signal at input 186 of the comparator 188 rises to a level above that of Vthreshold, causing the output of comparator 188 to change state, this does not affect the output 204 of the latch circuit 198. Once the latch circuit output 204 is latched at a logic low level to disable the driver circuit 122, no further change of the output 194 of comparator 188 will cause a state change in the output 204 of the latch circuit 198. The only way to change the output 204 of the latch circuit 198 is for the user to momentarily fully release the on/off trigger 20a (so that the on/off trigger 20a assumes its "off" position), which removes the "on" signal generated by the trigger 20a, and then re-engage the on/off trigger 20a to its "on" position. When the on/off trigger 20a is momentarily released, this removes the logic low level signal on circuit line 202, and thus removes the logic low level signal from input 200 of the latch circuit 198. The signal applied to input 186 of the comparator 188 will have risen, during the time it takes the user to release and then reengage the trigger 20a, to a level exceeding Vthreshold, thus causing a logic high level signal to be generated at output 194. This will, in turn, immediately cause the output 204 of the latch circuit 198 to go to a logic high level, thus enabling the driver subsystems within the driver circuit 122.

Conversely, if the on/off trigger switch 20a is not being held in the closed position when AC power is first applied to the power tool, then a logic high level signal is applied to the input 200 of the latch circuit 198 via circuit line 202. The output of the latch circuit 198 will initially be at a logic low level, but as the voltage at input 186 exceeds the Vthreshold voltage on input 192 of the comparator 188, the comparator 188 output will go to a logic high level. This signal is applied to the input 196 of the latch circuit 198. At this point the latch circuit output 204 will go to a logic high level and be latched thereat. The logic high level signal from output 204 enables the driver circuit 122. Releasing the on/off trigger 20a at this point does not change the output of the latch circuit 198. Accordingly, the power tool can thereafter be powered on and off in the usual fashion with the on/off trigger 20a. However, if AC power is removed from the power tool inadvertently while the on/off switch 20a is being held in the "on" position, and then AC power is reapplied to the tool, the system 100 will prevent immediate starting of the motor 14 of the power tool as described above.

The no-volt release circuit described above thus monitors for the condition where the on/off trigger switch 20a may be engaged in the "on" position when AC power is first applied to the system 100 (and thus to the power tool), thus preventing accidental powering-on of the tool associated with the system 100. Importantly, the no-volt release circuit forms an essentially independent circuit that performs this monitoring function independent of the controller 118. Thus, a malfunction of the controller 118 will not interfere with the monitoring function performed by the system 100 described herein.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. An excitation circuit for a flux switching motor having a field winding and an armature winding, comprising:
    a rectifier circuit for converting an AC input signal into a rectified AC signal;
    an H-bridge switching circuit responsive to said rectified AC output and being coupled across said armature winding, said H-bridge switching circuit including a plurality of switches, at least a designated pair of said switches each having a bypass element;
    an armature energy recovery capacitor coupled across an output of said switching circuit;
    said bypass elements of said designated pair of switches of said H-bridge switching circuit permitting recirculation of armature current through said armature winding during a start-up phase of operation of said motor regardless of a direction of current flow through said armature winding; and
    a controller for controlling on and off switching of each of said switches of said H-bridge circuit.

2. The excitation circuit of claim 1, further comprising:
    a semiconductor coupled across said field winding for energy recirculation; and
    a switch element controlled by said controller for switching said semiconductor across said field winding during said start-up phase of operation of said motor.

3. The excitation circuit of claim 2, wherein said switch element comprises a relay for recirculating field energy.

4. The excitation circuit of claim 1, wherein said bypass elements comprise free wheeling diodes.

5. The excitation circuit of claim 1, wherein said controller provides a pulse width modulation (PWM) switching signal to selected ones of said switches during said start-up phase of operation.

6. The excitation circuit of claim 1, wherein said controller controls said H-bridge switching circuit to effect a braking action when said motor is turned off.

7. The excitation circuit of claim 1, further comprising a capacitor of 10 ufd–15 ufd coupled across an output of said rectifier circuit.

8. The excitation circuit of claim 1, further comprising:
    an on/off switch for controlling the application of said AC input signal to said excitation circuit; and
    a detection circuit for detecting if said AC input signal has been applied to said excitation circuit while said on/off switch is being held by a user in an on position, and for preventing said AC input signal from starting said motor.

9. The excitation circuit of claim 8, wherein said detection circuit enables said AC input signal to be applied to said excitation circuit to start said motor only after said user has released said on/off switch from said on position into an off position.

10. The excitation circuit of claim 8, wherein said detection circuit comprises:
    a rectifier circuit;
    a comparator responsive to an output of said rectifier circuit; and
    a latch circuit responsive to engagement of said on/off switch and an output of said comparator for generating a signal for controlling said excitation circuit to control turning on of said motor in response to a position of said on/off switch.

11. The excitation circuit of claim 10, further comprising:
    a voltage divider circuit operably coupled to said rectifier circuit; and
    a capacitor coupled to an input of said comparator and to said voltage divider circuit, for providing a time delay to an input signal applied to said comparator, to thereby provide a time period during which portions of said excitation circuit may be powered on so that said position of said on/off switch can be detected.

12. An excitation circuit for a flux switching motor having a field winding and an armature winding, comprising:
    a rectifier circuit for converting an AC input signal into a rectified AC signal;
    an H-bridge switching circuit responsive to said rectified AC output and being coupled across said armature winding;
    an armature energy recovery capacitor coupled across an output of said switching circuit;
    a controller for controlling an on and off switching of each of said switch components of said H-bridge circuit; and
    an on/off switch operably associated with said controller and engageable by a user between an on position and an off position, for signaling said controller when a user is powering on and off said excitation circuit; and
    a detection circuit responsive to said position of said on/off switch and to an application of said AC input signal to said excitation circuit for preventing immediate turn on of said excitation circuit if said AC input signal is first applied to said excitation circuit while a user is holding said on/off switch in an on position.

13. The excitation circuit of claim 12, wherein said detection circuit comprises a latching circuit responsive to the application of said AC input signal to said excitation circuit and to a position of said on/off switch; and
    said latching circuit generating a signal for preventing commutation of said flux switching motor if said user is holding said on/off switch in said on position when said AC input signal if initially applied to said excitation circuit.

14. The excitation circuit of claim 12, said H-bridge switching circuit comprising:
    a plurality of bypass elements for permitting recirculation of armature current through selected switch components of said H-bridge circuit and through said armature winding during a start-up phase of operation of said motor.

15. An excitation circuit for a flux switching motor having a field winding and an armature winding, said excitation circuit comprising a rectifier circuit for receiving an AC input signal and generating a rectified AC signal over a pair of DC bus lines;
    an H-bridge switching circuit coupled across said DC bus lines, said armature winding being coupled between selected ones of a plurality of switch components of said H-bridge switching circuit, at least a designated pair of said switch components each having a bypass elements associated therewith an armature recovery capacitor coupled across said DC bus lines and across said switching circuit said bypass elements of said H-bridge switching circuit permitting recirculation of armature current flowing through said armature winding during a stand-up phase of operation of said motors regardless of a direction of current flow through said armature winding; and a controller for generating a switching signal for controlling said H-bridge switching circuit, said controller producing a pulse width modulated (PWM) switching signal for controlling said switch components.

16. The excitation circuit of claim 15, further comprising a capacitor coupled across said DC bus lines.

17. The excitation circuit of claim 15, further comprising a current bypass element coupled across said field winding during a start-up phase of operation of said motor.

18. The excitation circuit of claim 17, wherein said current bypass element comprises a diode; and wherein said diode is selectively switched across said field winding to provide a current path during said start-up phase.

19. The excitation circuit of claim 18, further comprising a relay responsive to said controller for selectively switching said diode across said field winding.

20. The excitation circuit of claim 15, wherein said controller controls said H-bridge circuit to implement a regenerative braking action when said motor is turned off.

21. A method for exciting a flux switching motor having a field winding and an armature winding, said method comprising providing an AC input signal from an AC power source using a rectifier to receive said AC input signal and generate a rectified AC signal on a pair of DC bus lines using an H-bridge switching circuit having a plurality of independent controllable switching elements with a designated pair of said switching elements each having a bypass elements and with said H-bridge switching circuit being operable coupled across said armature winding to selectively direct an armature current flow through said armature winding;

using said bypass elements to permit recirculation of said current flow through said armature winding via said designated pair of switching elements and said bypass elements during start-up phase of operation of said motor;

using a controller to control said H-bridge to operate said motor and to effect bi-directional recirculation of said armature current through said armature winding; and using an armature energy recovery capacitor coupled across said H-bridge switching circuit to store armature energy during operation of said motor.

22. A method for exciting a flux switching motor having a field winding and an armature winding, said method comprising providing an AC input signal from an AC power source rectifying said AC input signal to generate a rectified AC signal;

applying said rectified AC signal to a switching circuit associated with said armature winding to alternately switch a direction of armature current flowing through said armature winding;

an H-bridge switching circuit using a plurality of bypass elements with said switching circuit to permit recirculation of said armature current flowing through said armature winding when switching the direction of said flow of said armature current through said armature winding;

using a controller to control operation of said switching circuit;

and using an energy recovery capacitor to store armature energy during operation of said switching circuit.

23. A method for controlling a flux switching motor, comprising:

defining a first start-up speed range;

defining a second start-up speed range subsequent to said first start-up speed range;

defining a first time envelope during which a pulse width modulated (PWM) switching signal having a predetermined duty cycle is to be applied to said flux switching motor;

applying said PWM switching signal, in accordance with said first time envelope, to said flux switching motor to commutate said flux switching motor during said first start-up speed range;

modifying said first time envelope to produce a second time envelope;

at a beginning of said second start-up speed range, applying said PWM switching signal in accordance with said second time envelope to continue commutating said flux switching motor.

24. The method of claim 23, wherein said first and second time envelopes are defined in relation to a pulse speed signal indicative of a motor speed of said flux switching motor.

25. The method of claim 24, wherein said second time envelope has a shorter time period than said first time envelope.

26. The method of claim 24, wherein said predetermined duty cycle of said PWM switching signal is modified during said second start-up speed range.

27. A method for commutating a flux switching motor, said method comprising:

defining a first speed range for said flux switching motor;

defining a second speed range for said flux switching motor;

applying a plurality of turn-on electrical commutation pulses to said flux switching motor during said first speed range, each of said turn on electrical commutating pulses comprising a pulse width modulated (PWM) commutating signal having a predetermined duty cycle;

said PWM commutating signal being further applied in accordance with a first predefined time envelope such that an overall time period of each of said turn-on electrical commutation pulses is controlled; and modifying said first predefined time envelope to produce a second predefined time envelope such that said overall time period of each of said turn-on electrical commutating pulses is modified.

28. The method of claim 27, wherein said first and second predefined time envelopes are generated in relation to a motor speed signal indicative of a speed of said flux switching motor.

29. The method of claim 27, wherein said second predefined time envelope has a shorter duration than said first predefined time envelope.

30. The method of claim 27, wherein said predetermined duty cycle of said PWM commutating signal is modified during said second speed range.

31. A method for commutating a flux switching motor, comprising:

sensing a motor speed of said flux switching motor;

generating a commutating signal including a plurality of turn-on commutating pulses that are applied to said flux switching motor to commutate said motor, each said turn-on commutating pulse being comprised of a pulse width modulated (PWM) signal; and modifying a time envelope during which each said turn-on pulse is applied to said flux switching motor in accordance with said sensed motor speed to further control the power applied to said motor as said motor increases in speed from a non-rotating condition to a condition wherein said motor is operating at a rated motor speed.

32. The method of claim 31, wherein said time envelope is reduced as said motor speed of said flux switching motor increases.

33. The method of claim 31, wherein a duty cycle of said PWM signal is modified as said motor speed of said flux switching motor increases.

34. The method of claim 31, where said PWM signal is ceased and a single turn-on pulse is applied, in accordance with said time envelope, when said flux switching motor reaches a predetermined motor speed.

35. A method for commutating an electric motor from a non-rotating condition up to a predetermined operating speed, comprising:

sensing a motor speed of said motor;

applying a pulsed, turn-on electrical commutation signal comprised of a plurality of turn-on pulses, each said turn-on pulse including a pulse width modulated (PWM) signal having a predetermined duty cycle, to said motor to commutate said motor;

further controlling said turn-on pulses by modifying a time envelope of each said turn-on pulse as said motor speed increases such that an amount of power delivered to said motor is varied as said motor speed increases.

36. The method of claim 35, further comprising modifying said predetermined duty cycle in accordance with said sensed motor speed such that said predetermined duty cycle increases in percentage as said motor speed increases.

37. The method of claim 35, further comprising ceasing generation of said PWM signal at a predetermined sensed motor speed and using a plurality of single pulses each having a period in accordance with said time envelope.

38. A power tool comprising:

an on/off switch engageable by a user for turning on and off said power a flux switching motor having a field winding and an armature winding;

an excitation circuit including: a rectifier circuit for receiving an AC input signal and generating a rectified AC signal over a pair of DC bus lines;

an H-bridge switching circuit coupled across said DC bus lines said armature winding being coupled between selected ones of a plurality of switch components of said H-bridge switching circuit;

an armature recovery capacitor coupled across said DC bus lines and across said switching circuit said H-bridge switching circuit including a plurality of bypass elements for permitting recirculation of armature current flowing through said armature winding during a startup phase of operation of said motor; and a controller responsive to said operation of said on/off switch for generating a pulse width modulated switching signal for controlling said H-bridge switching circuit to control on and off switching of selected ones of said switch components to commutate said motor.

39. The power tool of claim 38, further comprising a detection circuit for detecting if said on/off switch is being held by said user in an on position when an AC signal is first applied to said power tool, to prevent said flux switching motor from being turned on.

40. The power tool of claim 39, wherein said detection circuit comprises a latch circuit, said latch circuit detecting when said on/off switch has been released after said AC signal has initially been applied to said power tool, to thereafter enable said power tool to be turned on.

41. The power tool of claim 39, wherein said H-bridge switching circuit further comprises a driver circuit: and wherein said latch circuit applies an output signal to said driver circuit to control said H-bridge switching circuit independently of operation of said controller.

42. A power tool comprising:

an on/off switch engageable by a user for placing said tool in an on condition and an off condition;

a flux switching motor having a field winding and an armature winding, said excitation circuit comprising:

a rectifier circuit for receiving an AC input signal and generating a rectified AC signal over a pair of DC bus lines;

an H-bridge switching circuit coupled across said DC bus lines, said armature winding being coupled between selected ones of a plurality of switch components of said H-bridge switching circuit;

an armature recovery capacitor coupled across said DC bus lines and across said switching circuit; and a controller for generating a switching signal for controlling said H-bridge switching circuit, said controller producing a pulse width modulated (PWM) switching signal for controlling selected ones of said switch components;

said power tool further including a detection circuit responsive to a position of said on/off switch for preventing powering on of said power tool if said AC input signal is initially applied to said power tool while said user is holding said on/off switch in an on position.

43. The power tool of claim 42, wherein said detection circuit includes a latching circuit responsive to said on/off switch for enabling said H-bridge switching circuit for operation independently of said controller.

44. The apparatus of claim 42, said H-bridge switching circuit further comprising:

a plurality of bypass elements for permitting recirculation of armature current flowing through said armature winding during a start-up phase of operation of said motor.

* * * * *

UNITED STATES PATENT AND TRADEMARK OFFICE
CERTIFICATE OF CORRECTION

PATENT NO. : 6,943,510 B2
DATED : September 13, 2005
INVENTOR(S) : Bhanu Gorti

It is certified that error appears in the above-identified patent and that said Letters Patent is hereby corrected as shown below:

Title page,
Item [60], Related U.S. Application Data, "60/370,352" should be -- 60/310,382 --.

Column 15,
Line 47, "ufd" should be -- $\mu$fd -- (both occurrences).

Column 16,
Line 44, "if" should be -- is --.
Line 63, delete "a".
Line 64, after "therewith" insert -- , --.

Column 17,
Line 2, "stand-up" should be -- start-up --.
Line 31, delete "a".
Line 32, "operable" should be -- operably --.

Column 19,
Line 49, after "circuit" insert -- ; --.

Signed and Sealed this

Twenty-fourth Day of January, 2006

JON W. DUDAS
*Director of the United States Patent and Trademark Office*